United States Patent
Matsuura et al.

(10) Patent No.: US 6,455,195 B1
(45) Date of Patent: Sep. 24, 2002

(54) HYDROGEN ABSORBING ALLOY ELECTRODES AND NICKEL-METAL HYDRIDE BATTERIES USING THE SAME

(75) Inventors: Yoshinori Matsuura, Hirakata; Reizo Maeda, Kasai; Katsuhiko Shinyama, Higashiosaka; Tadayoshi Tanaka, Takatsuki; Toshiyuki Nohma; Ikuo Yonezu, both of Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 63 days.

(21) Appl. No.: 09/666,050

(22) Filed: Sep. 20, 2000

(30) Foreign Application Priority Data

Sep. 21, 1999 (JP) .............................. 11-266763

(51) Int. Cl.$^7$ ............................ H01M 4/62; H01M 4/24
(52) U.S. Cl. ..................................... 429/218.2; 429/217
(58) Field of Search .............................. 429/218.2, 217

(56) References Cited

U.S. PATENT DOCUMENTS 6,284,409 B1 * 9/2001 Higashiyama et al. ... 429/218.2
6,287,725 B1 * 9/2001 Maeda et al. ............ 429/218.2

FOREIGN PATENT DOCUMENTS

| EP | 0 904 771 A1 | 8/1998 |
| JP | 11-025989 A | 1/1999 |
| JP | 11-071572 A | 3/1999 |
| JP | 2000149955 | * 5/2000 |

* cited by examiner

Primary Examiner—John S. Maples
(74) Attorney, Agent, or Firm—Kubovcik & Kubovcik

(57) ABSTRACT

A hydrogen absorbing alloy electrode is prepared by adding a binder to a hydrogen absorbing alloy powder and forming the mixture to a shape of an electrode, and the binder is partly or entirely made of poly N-vinyl acetamide, whereby higher high-rate discharge characteristics are obtained than conventionally.

10 Claims, 1 Drawing Sheet

HYDROGEN ABSORBING ALLOY ELECTRODES AND NICKEL-METAL HYDRIDE BATTERIES USING THE SAME

FIELD OF INVENTION

The present invention relates to hydrogen absorbing alloy electrodes for use as negative electrodes of nickel-metal hydride batteries.

BACKGROUND OF THE INVENTION

While nickel-cadmium batteries and lead batteries are already in wide use as secondary batteries, it is desired especially in recent years to develop secondary batteries which have a high energy density and are yet clean with advances in compact information devices such as cellular phones and notebook computers. Accordingly, attention has been directed to closed-type nickel-metal hydride batteries wherein an electrode of hydrogen absorbing alloy is used as the negative electrode.

Nickel-metal hydride batteries comprise a negative electrode of hydrogen absorbing alloy, a positive electrode of nickel hydroxide, an alkaline electrolyte, a separator, etc. The hydrogen absorbing alloy electrode serving as the negative electrode is prepared by adding a binder to a hydrogen absorbing alloy powder obtained by pulverizing a hydrogen absorbing alloy ingot, and forming the mixture to a shape of an electrode.

With nickel-metal hydride batteries wherein a negative electrode of hydrogen absorbing alloy is used, a gas-phase reaction and an electrochemical reaction proceed at the same time on the surface of the hydrogen absorbing alloy by virtue of the contact of the alloy surface with the alkaline electrolyte. More specifically, in the relationship between the hydrogen pressure and the temperature, hydrogen is absorbed by the hydrogen absorbing alloy, or the hydrogen absorbing alloy desorbs hydrogen (gas-phase reaction). In the relationship between the voltage and the current, on the other hand, application of voltage (charging) causes absorption of hydrogen by the hydrogen absorption alloy of the hydrogen produced by the electrolysis of water, and delivery of current (discharge) causes oxidation of hydrogen to water (electrochemical reaction).

However, the conventional nickel-metal hydride battery has the problem of failing to achieve sufficiently high high-rate discharge characteristics.

SUMMARY OF THE INVENTION

An object of the present invention is to provide a hydrogen absorbing alloy electrode which achieves higher high-rate discharge characteristics than conventionally, and a nickel-metal hydride battery using the electrode. The present inventors conducted intensive research to clarify the cause of failing to achieve sufficiently high high-rate discharge characteristics for the conventional nickel-metal hydride battery. As a result, it revealed that the above cause is that carboxymethylcellulose (CMC), etc. which is conventionally used as a binder is low in retention of liquids, to accomplish the present invention.

Specifically, with the conventional nickel-metal hydride batteries, the binder has the reduced retention of liquids since CMC is low in retention of liquids, to give reduced retention of liquids to the electrode in its entirety. Because of this a supplying speed of hydroxide ion to the negative electrode is kept low, to lead to reduced likelihood of discharge reaction. Accordingly, operating voltage at the time of high-rate discharge is decreased, failing to achieve sufficiently high high-rate discharge characteristics.

The hydrogen absorbing alloy electrode of the invention is prepared by adding a binder to a hydrogen absorbing alloy powder, and forming the mixture to a shape of an electrode. The binder is partly or entirely made of poly N-vinyl acetamide (PNVA). With the hydrogen absorbing alloy electrode of the invention, PNVA for use as the binder is higher in retention of liquids than CMC used conventionally, increasing an amount of retention of liquids by virtue of the binder, to increase an amount of retention of liquids for the electrode in its entirety. The increase of the retention of liquids in amount for the electrode in its entirety leads to the high supplying speed of hydroxide ion to the negative electrode, to activate the discharge reaction. Consequently, operating voltage is high at the time of high-rate discharge to improve the high-rate discharge characteristics.

Stated specifically, said PNVA is added in a proportion of 0.1 to 1.0 wt. % based on the hydrogen absorbing alloy powder. In the case where PNVA is added in a proportion below 0.1 wt. % based on the hydrogen absorbing alloy powder, the electrode in its entirety is not effectively increased in the amount of retention of liquids by virtue of PNVA, so that high-rate discharge characteristics can not be improved sufficiently. On the other hand, when PNVA is added in a proportion greater than 1.0 wt. % based on the hydrogen absorbing alloy powder, the contact between alloy particles and that between a substrate and an alloy particle will be deteriorated by the increase of the amount of the binder, to increase the resistance of the electrode, having an operating voltage at the time of high-rate discharge decreased, failing to achieve sufficiently high high-rate discharge characteristics. Consequently, PNVA is preferably added within the range of the above.

Further specifically, the binder is partly made of water-soluble macromolecule and/or rubber resin. The water-soluble macromolecule or the rubber resin is relatively excellent in binding materials, to enhance binding force between the substrate and the alloy particles, retaining an alloy particle on the substrate reliably. The water-soluble macromolecule or the rubber resin has a relatively high elasticity, to prevent a hydrogen absorbing alloy from dropping from an electrode when a separator is interposed between a hydrogen absorbing alloy electrode serving as a negative electrode and a positive electrode to have them rolled up.

Stated more specifically, the water-soluble macromolecule and the rubber resin are added in a combined proportion of 0.2 wt. % to 2.0 wt. %, or the water-soluble macromolecule or the rubber resin is added in a proportion of 0.2 wt. % to 2.0 wt. % based on the hydrogen absorbing alloy powder. In the case where the water-soluble macromolecule and the rubber resin are added in a combined proportion below 0.2 wt. %, or the water-soluble macromolecule or the rubber resin is added in a proportion below 0.2 wt. % based on the hydrogen absorbing alloy powder, binding force between alloy particles and that between a substrate and an alloy particle is weakened, to deteriorate the contact between them, increasing the resistance of the electrode relatively, to have an operating voltage at the time of high-rate discharge relatively decreased, failing to achieve sufficiently high high-rate discharge characteristics. On the other hand, in the case where the water-soluble macromolecule and the rubber resin are added in a combined proportion greater than 2.0 wt. %, or the water-soluble macromolecule or the rubber resin is added in a proportion greater than 2.0 wt. % based on the hydrogen absorbing alloy powder, binding force between alloy particles and that between a substrate and an alloy particle is deteriorated by the increase of the amount of the binder, to increase the resistance of the electrode, having an operating voltage at the time of a high-rate discharge decreased, failing to achieve sufficiently high high-rate discharge characteristics. Accordingly, the water-soluble macromolecule and the rubber resin are preferably added in a combined proportion within the range of the above, or the water-soluble macromolecule or the rubber resin is preferably added in a proportion within the range of the above.

Further more specifically, the water-soluble macromolecule is polyvinyl pyrrolidone (PVP), polyvinyl alcohol (PVA) or hydroxy propyl cellulose (HPC), and the rubber resin is acrylic acid ester, polystyrene, silicone, or a copolymer of styrene-methacrylic acid ester-acrylic acid ester. The binder described is partly made of one or more kinds of the water-soluble macromolecule and/or rubber resin selected from among the water-soluble macromolecule or the rubber resin.

The hydrogen absorbing alloy electrode is prepared by adding a binder to the hydrogen absorbing alloy powder to obtain a paste, coating a surface of a substrate (a current collector) with the paste, and drying the paste. With the specific construction, PNVA for use as a binder, and the water-soluble macromolecule and the rubber resin are higher in heat-resistance than CMC used conventionally, so that the paste can be dried at a temperature of 100° C. to 150° C. Accordingly, while the paste is heretofore dried at around 50° C. due to CMC having a lower heat-resistance, the drying can be made within a shorter period of time than conventionally. As a result, the electrode can be prepared in a shorter period of time.

As described above, with the nickel-metal hydride battery using the hydrogen absorbing alloy electrode of the invention, higher high-rate discharge characteristics can be obtained than conventionally.

DETAILED DESCRIPTION OF EMBODIMENTS

Figure 1:
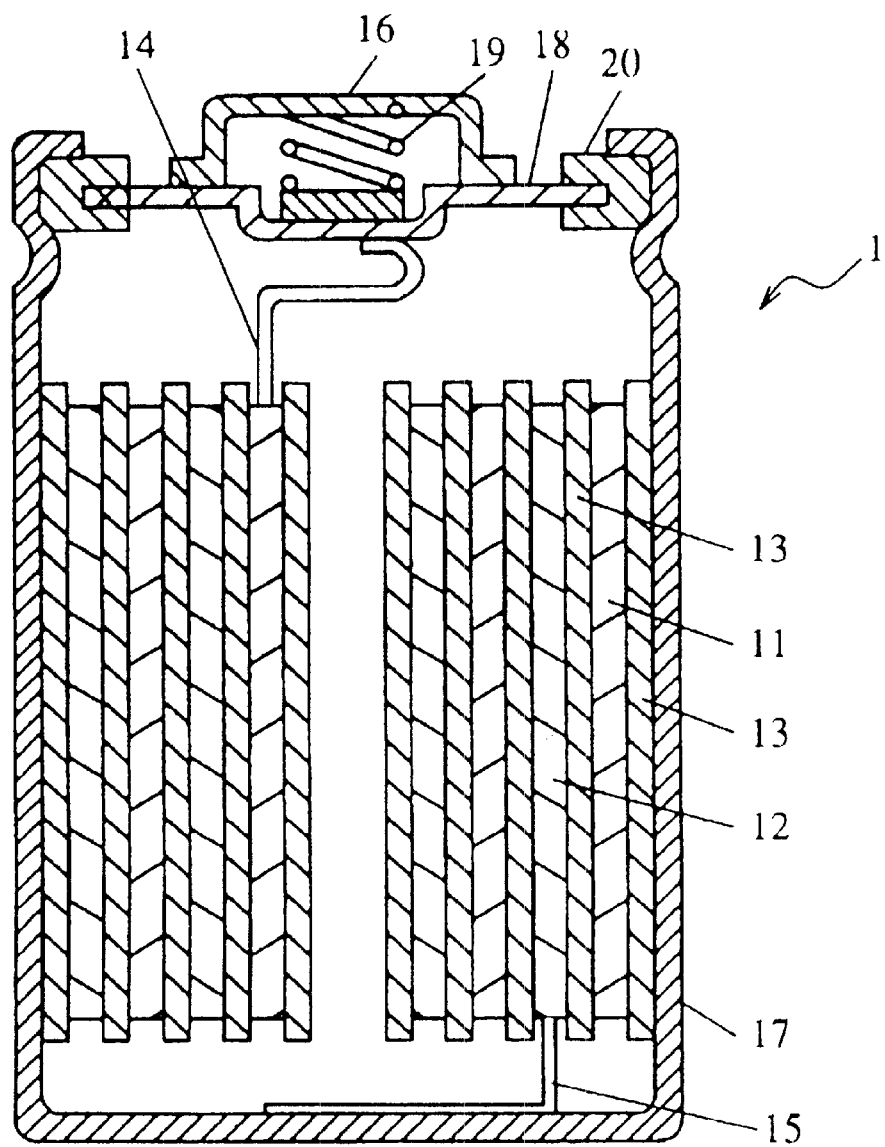
FIG. 1 is a view in section of the nickel-metal hydride battery embodying the invention.

A hydrogen absorbing alloy electrode for use as a negative electrode of a nickel-metal hydride battery shown in FIG. 1 embodying the invention will be described below in detail with reference to the drawings. FIG. 1 shows a construction of a nickel-metal hydride battery of AA size and of the type wherein the positive electrode is dominant, and the present invention is to be practiced. The illustrated battery, which is an alkaline storage battery, has a closed construction comprising a positive electrode 11, negative electrode 12, separator 13, positive electrode lead 14, negative electrode lead 15, external positive terminal 16, can 17 serving also as a negative terminal, closure 18, etc. The positive electrode 11 and the negative electrode 12 are accommodated, as rolled up in a spiral form with the separator 13 interposed therebetween, in the can 17. The positive electrode 11 is connected by the lead 14 to the closure 18, and the negative electrode 12 by the lead 15 to the can 17. An insulating packing 20 is provided at the junction of the can 17 and the closure 18 to seal off the battery 1. A coiled spring 19 is interposed between the external positive terminal 16 and the closure 18. The spring 19 is compressed to release a gas from inside the battery to the atmosphere when the internal pressure of the battery builds up abnormally.

In the production process of the hydrogen absorbing alloy electrode for use as the negative electrode 12, alloy materials, as prepared in a specified composition, are high-frequency melted, and the molten liquid obtained is allowed to cool spontaneously to prepare an ingot of the hydrogen absorbing alloy.

The hydrogen absorbing alloy usable is a rare earth nickel-metal hydride absorbing alloy represented by the formula $MmNi_aCo_bAl_cMn_d$ wherein Mm is a mixture of at least two or more elements selected from among La, Ce, Pr, Nd, Sm, Eu, Sc, Y, Pm, Gd, Tb, Dy, Ho, Er, Tm, Yb, and Lu, a, b, c and d are such that a>0, b>0, c>0 d≧0, 4.4≦a+b+c+d≦5.2. More particularly, with the above formula $MmNi_aCo_bAl_cMn_d$, Mm is a mixture of at least two or more elements selected from among La, Ce, Pr, Nd, and Sm, and a rare earth nickel-metal hydride absorbing alloy consisting mainly of the mixture described is preferably used. Further, it is preferable to use a rare earth nickel-metal hydride absorbing alloy represented by the above formula $MmNi_aCo_bAl_cMn_d$ wherein a, b, c, and d are such that 2.8≦a≦5.2, 0<b≦1.4, 0<c≦1.2, 0≦d≦1.2. To obtain a battery with a large cell capacity, the rare earth nickel-metal hydride absorbing alloy wherein c and d are such that 0<c≦1.0, 0≦d≦1.0 is preferably used.

Furthermore, the hydrogen absorbing alloy usable is not limited to the rare earth nickel-metal hydride absorbing alloy, but Zr—Ni hydrogen absorbing alloy like Zr—Ni, etc., Ti—Fe hydrogen absorbing alloy like TiFe, etc., Zr—Mn hydrogen absorbing alloy like $ZrMn_2$, etc., Ti—Mn hydrogen absorbing alloy like $TiMn_{1.5}$, etc., or Mg—Ni hydrogen absorbing alloy like $Mg_2Ni$, etc. can also be used.

Next, the ingot described is mechanically pulverized in the air to obtain a hydrogen absorbing alloy powder having a mean particle size of 10 μm to 70 μm. The alloy powder is thereafter mixed with an aqueous solution containing PNVA as a binder to prepare a paste. Or the other way to prepare a paste is that the alloy powder, an aqueous solution containing PNVA as a binder, one or more solutions or powders having a water-soluble macromolecule or rubber resin are mixed together.

Examples of a useful aqueous solution of a water-soluble macromolecule are PVP, PVA and HPC. Examples of a useful solution or a powder of a rubber resin are acrylic acid ester, polystyrene, silicone, copolymer of styrene-methacrylic acid ester-acrylic acid ester, ethylene-propylene-diene mongers (EPDM), styrene-ethylene-butene-styrene (SEBS), styrene-butadiene rubber (SBR), and isoprene rubber. The solution of the rubber resin usable is the solution wherein the rubber resin is melted in an organic solvent, or dispersed, emulsionized, or suspended in water.

PNVA should be present in a proportion of 0.1 wt. % to 1.0 wt. % based on the hydrogen absorbing alloy powder. In the case where the water-soluble macromolecule and/or the rubber resin are used for a binder in addition to PNVA, the water-soluble macromolecule and the rubber resin combined should be present in a proportion of 0.2 wt. % to 2.0 wt. %, or the water-soluble macromolecule or the rubber resin should be present in a proportion of 0.2 wt. % to 2.0 wt. % based on the hydrogen absorbing alloy powder.

Next, the paste described is applied to opposite surfaces of punching metal plated with nickel, followed by drying at a temperature of 100° C. to 150° C. for ten minutes and cutting to a predetermined size, whereby a hydrogen absorbing alloy electrode is produced. Since the binder described is excellent in heat-resistance the binding force of the binder is not deteriorated even with drying at a temperature of 100° C. to 150° C. Thus drying at a temperature of 100° C. to 150° C. shortens the time for drying by 20 minutes as compared with drying conventionally at a temperature of 50° C. due to the low heat-resistance of the binder.

The electrode thus obtained is incorporated as the negative electrode into the nickel-metal hydride battery shown in FIG. 1. A sintered nickel electrode is usable as the positive electrode, a polyamide nonwoven fabric as the separator, and a 30 wt. % aqueous solution of potassium hydroxide as the electrolyte.

Next, the hydrogen absorbing alloy electrode of the invention was checked for performance by the following experiments with the results to be described below.

EXAMPLES 1–7

(1) Preparation of Hydrogen Absorbing Alloy Powder

Mm, Ni, Co, Al, and Mn were mixed together in a specified mole ratio, and the mixture was high-frequency melted and thereafter allowed to cool spontaneously to a hydrogen absorbing alloy represented by the formula $MmNi_{3.4}\,CO_{0.8}\,Al_{0.3}\,Mn_{0.5}$. The ingot of the hydrogen absorbing alloy was mechanically pulverized in the air to obtain an alloy powder with a mean particle size of 60 μm.

(2) Preparation of Battery Electrodes

Seven kinds of pastes were prepared by mixing together 10 parts by weight of the hydrogen absorbing alloy powder, 1 part by weight of an aqueous solution having 5 wt. % of PNVA serving as a binder 1 (PNVA is present in a proportion of 0.5 wt. % based on the alloy powder.), and 0.25 part by weight of a solution having 20 wt. % of PVP, PVA, HPC, dimethyl silicone rubber, polystyrene, copolymerized resin of styrene-acrylic acid methyl-methacrylic acid methyl, or PNVA serving as a binder 2 (the binder 2 is present in a proportion of 0.5 wt. % based on the alloy powder). The seven pastes described were applied to opposite surfaces of punching metal plated with nickel, followed by drying at room temperature and cutting to a predetermined size, whereby seven kinds of hydrogen absorbing alloy electrodes were fabricated, respectively.

(3) Preparation of Nickel-metal Hydride Batteries

The seven kinds of electrodes thus obtained were used as negative electrodes to assemble seven kinds of nickel-metal hydride batteries A1 to A7 and of the type wherein the positive electrode is dominant with the construction shown in FIG. 1. A sintered nickel electrode was used as the positive electrode, a polyamide nonwoven fabric as the separator, and a 30 wt. % aqueous solution of potassium hydroxide as the electrolyte.

EXAMPLES 8–11

The binder 2 used was PVP, and the binder 1 used was PNVA with varying proportions, 0.07 wt. %, 0.1 wt. %, 1.0 wt. %, and 1.3 wt. %, to prepare four kinds of pastes which were different in proportion of PNVA. Four kinds of nickel-metal hydride batteries A8–A11 were fabricated in the same manner as in the examples 1–7 with the exception of varying the proportion of PNVA.

EXAMPLES 12–16

The binder 2 used was PVP, and said PVP was added with varying proportions, 0.15 wt. %, 0.2 wt. %, 1.0 wt. %, 2.0 wt. %, 2.3 wt. % based on the alloy powder, to prepare five kinds of pastes which were different in proportion of PVP. Five kinds of nickel-metal hydride batteries A12–A16 were fabricated in the same manner as in the examples 1–7 with the exception of varying the proportion of PVP.

COMPARATIVE EXAMPLE 1

The conventional nickel-metal hydride battery B1 was fabricated in the same manner as in the examples 1–7 with the exception of using CMC serving as the binder 1 and PVP serving as the binder 2 for preparing a paste.

COMPARATIVE EXAMPLE 2

The conventional nickel-metal hydride battery B2 was fabricated in the same manner as in the examples 1–7 with the exception of using PVP serving as the binder 1 and the binder 2 for preparing a paste.

High-rate Discharge Characteristics

Each of the batteries A1–A16, B1, and B2 thus obtained was charged at a current value of 120 mA at room temperature for 16 hours, and thereafter allowed to store at a temperature of 60° C. for 24 hours, and then discharged to final discharge voltage 1.0 V at a current value of 120 mA at a room temperature to conduct activation-treatment to each battery.

The batteries after the activation-treatment were charged at a current value of 120 mA (0.1 C) for 12 hours, and thereafter discharged to DOD (depth of discharge) 80% at a current value of 400 mA (⅓ C), and subsequently, discharged at a current value of 3600 mA (3 C), and checked for battery voltage after 30 seconds. The batteries checked for the experiment were four as for each example battery, to calculate a mean value for each example.

Test Results

The batteries A1–A16 of the examples 1–16 and B1 and B2 of the comparative examples 1 and 2 were checked for high-rate discharge characteristics. Tables 1 to 3 show the test results.

TABLE 1

| | NO. | BINDER 2 (0.5 WT. %) | BINDER 1 (0.5 WT. %) | HIGH-RATE DISCHARGE VOLTAGE (v) |
|---|---|---|---|---|
| EXAM. 1 | A1 | PVP | PNVA | 1.130 |
| EXAM. 2 | A2 | PVA | PNVA | 1.128 |
| EXAM. 3 | A3 | HPC | PNVA | 1.126 |
| EXAM. 4 | A4 | DIMETHYL SILICONE RUBBER | PNVA | 1.127 |
| EXAM. 5 | A5 | POLYSTYRENE | PNVA | 1.126 |
| EXAM. 6 | A6 | COPOLYMERIZED RESIN OF STYRENE-ACRYLIC ACID | PNVA | 1.128 |

TABLE 1-continued

|  | NO. | BINDER 2<br>(0.5 WT. %) | BINDER 1<br>(0.5 WT. %) | HIGH-RATE<br>DISCHARGE<br>VOLTAGE (v) |
|---|---|---|---|---|
| EXAM. 7 | A7 | METHYL-METHACRYLIC ACID METHYL PNVA | PNVA | 1.127 |
| COMPARATIVE EXAM. 1 | B1 | PVP | CMC | 1.058 |
| COMPARATIVE EXAM. 2 | B2 | PVP | PVP | 1.041 |

The batteries A1–A7 of the examples 1–7 and B1 and B2 of the comparative examples 1 and 2 were checked for high-rate discharge characteristics. Table 1 shows the test results. With the batteries A1–A6 of the examples 1–6, the binder 1 used is PNVA and the binder 2 used is water-soluble macromolecule of PVP, PVA, HPC, and rubber resin of dimethyl silicone rubber, polystyrene, copolymerized resin of styrene-acrylic acid methyl-methacrylic acid methyl, or PNVA, respectively. With the battery A7 of the example 7, PNVA is used as both the binder 1 and the binder 2. On the other hand, with the battery B1 of the comparative example 1, the binder 1 used is CMC and the binder 2 used is PVP. With the battery B2 of the comparative example 2, PVP is used as both the binder 1 and the binder 2.

Table 1 indicates that the batteries A1–A7 embodying the invention, wherein PNVA is used as the binder, are higher in voltage at the time of high-rate discharge rate (referred to as high-rate discharge voltage below) than conventional batteries B1 and B2 wherein PNVA is not used as the binder, to obtain excellent high-rate discharge characteristics. This is attributable to the following reason; PNVA is higher in retention of liquids than CMC or PVP which is used for the comparative examples 1 and 2, increasing retention of liquids by virtue of the binder, to increase retention of liquids with the electrode in its entirety. This makes the supplying speed of hydroxide ion to the negative electrode higher, activating discharge reaction. Accordingly, the voltage at the time of high-rate discharge is increased to improve high-rate discharge characteristics.

TABLE 2

|  | NO. | PROPORTION<br>OF PVP<br>(WT. %) | PROPORTION<br>OF PNVA<br>(WT. %) | HIGH-RATE<br>DISCHARGE<br>VOLTAGE (v) |
|---|---|---|---|---|
| EXAM. 8 | A8 | 0.5 | 0.07 | 1.094 |
| EXAM. 9 | A9 | 0.5 | 0.1 | 1.126 |
| EXAM. 1 | A1 | 0.5 | 0.5 | 1.130 |
| EXAM. 10 | A10 | 0.5 | 1.0 | 1.126 |
| EXAM. 11 | A11 | 0.5 | 1.3 | 1.096 |

The batteries A1 and A8–A11 of the examples 1 and 8–11 were checked for high-rate discharge characteristics. Table 2 shows the results. With the batteries A1 and A8–A11 of the examples 1 and 8–11, the binder 1 used is PNVA, the binder 2 used is PVP, PVP as the binder 2 is added in the equal proportion, and PNVA as the binder 1 is added in the different proportion. The proportion of PVP or PNVA refers to a proportion of PVP or PNVA based on the hydrogen absorbing alloy powder.

As will be apparent from Table 2 above, the battery A8 wherein PNVA is added in a proportion of 0.07 wt. % exhibits a smaller high-rate discharge voltage than the batteries A1, A9, A10 wherein PNVA is added in a proportion of 0.1 to 1.0 wt. %, giving an inferior high-rate discharge characteristic to the battery. The reason is that PNVA is added in a small proportion, so that the electrode in its entirety is not effectively increased in an amount of retention of liquids by virtue of PNVA. The battery A11 wherein PNVA is added in a proportion of 1.3 wt. % exhibits a smaller high-rate discharge voltage than the batteries A1, A9, A10 wherein PNVA is added in a proportion of 0.1 to 1.0 wt. %, giving an inferior high-rate discharge characteristic to the battery. The reason is that PNVA is added in a large proportion, so that contact between alloy particles and that between a substrate and an alloy particle is deteriorated, increasing the resistance of the electrode. As a result, PNVA is preferably added in a proportion of 0.1 wt. % to 1.0 wt. %.

TABLE 3

|  | NO. | PROPORTION<br>OF PVP<br>(WT. %) | PROPORTION<br>OF PNVA<br>(WT. %) | HIGH-RATE<br>DISCHARGE<br>VOLTAGE (v) |
|---|---|---|---|---|
| EXAM. 12 | A12 | 0.15 | 0.5 | 1.097 |
| EXAM. 13 | A13 | 0.2 | 0.5 | 1.127 |
| EXAM. 1 | A1 | 0.5 | 0.5 | 1.130 |
| EXAM. 14 | A14 | 1.0 | 0.5 | 1.129 |
| EXAM. 15 | A15 | 2.0 | 0.5 | 1.127 |
| EXAM. 16 | A16 | 2.3 | 0.5 | 1.099 |

The batteries A1 and A12–A16 of the example 1 and 12–16 were checked for high-rate discharge characteristics. Table 3 shows the result. With the batteries A1 and A12–A16 of the examples 1 and 12–16, the binder 1 used is PNVA, the binder 2 used is PVP, PNVA as the binder 1 is added in the equal proportion, and PVP as the binder 2 is added in the different proportion.

As will be apparent from Table 3, the battery A12 wherein PVP is added in a proportion of 0.15 wt. % exhibits a smaller high-rate discharge voltage than the batteries A1 and A13–A15 wherein PVP is added in a proportion of 0.2 to 2.0 wt. %, giving an inferior high-rate discharge characteristic to the battery. The reason is that PVP is added in a small proportion, so that binding force between alloy particles and that between a substrate and an alloy powder is relatively weak, to deteriorate the contact between them, increasing the resistance of the electrode. The battery A16 wherein PVP is added in a proportion of 2.3 wt. % exhibits a smaller high-rate discharge voltage than the batteries A1 and A13–A15 wherein PVP is added in a proportion of 0.2 to 2.0 wt. %, giving an inferior high-rate discharge characteristic to the battery. The reason is that PVP is added in a large proportion, deteriorating electric contact between particles and that between a substrate and an alloy particle, increasing the resistance of the electrode. As a result, PVP is preferably added in a proportion of 0.2 wt. % to 2.0 wt. %. Further, in the case where water-soluble macromolecule or rubber resin except PVP is used as the binder 2, the result obtained is same as Table 3 above.

The invention is not limited to the foregoing embodiments or examples in structure or feature but can be modified variously without departing from the spirit of the invention as set forth in the appended claims. For example, according to the embodiment described, the molten liquid obtained by melting the alloy material is allowed to cool spontaneously to prepare an ingot of a hydrogen absorbing alloy, and the ingot is mechanically pulverized in the air to obtain a hydrogen absorbing alloy powder, but melt-quenching process or gas atomizing process can be conducted to the molten liquid for pulverizing a powder to prepare a hydrogen absorbing alloy powder.

What is claimed is:

1. A hydrogen absorbing alloy electrode prepared by adding a binder to a hydrogen absorbing alloy powder and forming the mixture to a shape of an electrode, wherein said binder is partly or entirely made of poly N-vinyl acetamide.

2. A hydrogen absorbing alloy electrode according to claim 1 wherein said poly N-vinyl acetamide is added in a proportion of 0.1 wt. % to 1.0 wt. % based on the hydrogen absorbing alloy powder.

3. A hydrogen absorbing alloy electrode according to claim 1 wherein said binder is partly made of a water-soluble macromolecule and/or rubber resin.

4. A hydrogen absorbing alloy electrode according to claim 3 wherein said water-soluble macromolecule and said rubber resin are added in a combined proportion of 0.2 wt. % to 2.0 wt. %, or said water-soluble macromolecule or said rubber resin is added in a proportion of 0.2 wt. % to 2.0 wt. % based on the hydrogen absorbing powder.

5. A hydrogen absorbing alloy electrode according to claim 3 wherein said water-soluble macromolecule is polyvinyl pyrrolidone, polyvinyl alcohol or hydroxy propyl cellulose, and said rubber resin is acrylic acid ester, polystyrene, silicone, or copolymer of styrene-methacrylic acid ester-acrylic acid ester, and said binder is partly made of one or more water-soluble macromolecule and/or rubber resin selected from among said water-soluble macromolecule or said rubber resin.

6. A nickel-metal hydride battery comprising a hydrogen absorbing alloy electrode as a negative electrode prepared by adding a binder to a hydrogen absorbing alloy powder and forming the mixture to a shape of an electrode, wherein said binder is partly or entirely made of poly N-vinyl acetamide.

7. A nickel-metal hydride battery according to claim 6 wherein said poly N-vinyl acetamide is added in a proportion of 0.1 wt. % to 1.0 wt. % based on the hydrogen absorbing alloy powder.

8. A nickel-metal hydride battery according to claim 6 wherein said binder is partly made of water-soluble macromolecule and/or rubber resin.

9. A nickel-metal hydride battery according to claim 8 wherein said water-soluble macromolecule and said rubber resin are added in a combined proportion of 0.2 wt. % to 2.0 wt. %, or said water-soluble macromolecule or said rubber resin is added in a proportion of 0.2 wt. % to 2.0 wt. % based on the hydrogen absorbing powder.

10. A nickel-metal hydride battery according to claim 8 wherein said water-soluble macromolecule is polyvinyl pyrrolidone, polyvinyl alcohol or hydroxy propyl cellulose, and said rubber resin is acrylic acid ester, polystyrene, silicone, or copolymer of styrene-methacrylic acid ester-acrylic acid ester, and said binder is partly made of one or more water-soluble macromolecule and/or rubber resin selected from among said water-soluble macromolecule or said rubber resin.

* * * * *